Feb. 5, 1924.  1,482,973
C. B. CRAMER
LOW GEAR ATTACHMENT FOR FORDS
Filed Nov. 24, 1922   2 Sheets-Sheet 1

Inventor:
CARL B. CRAMER.
By Hazard and Miller
Attorneys

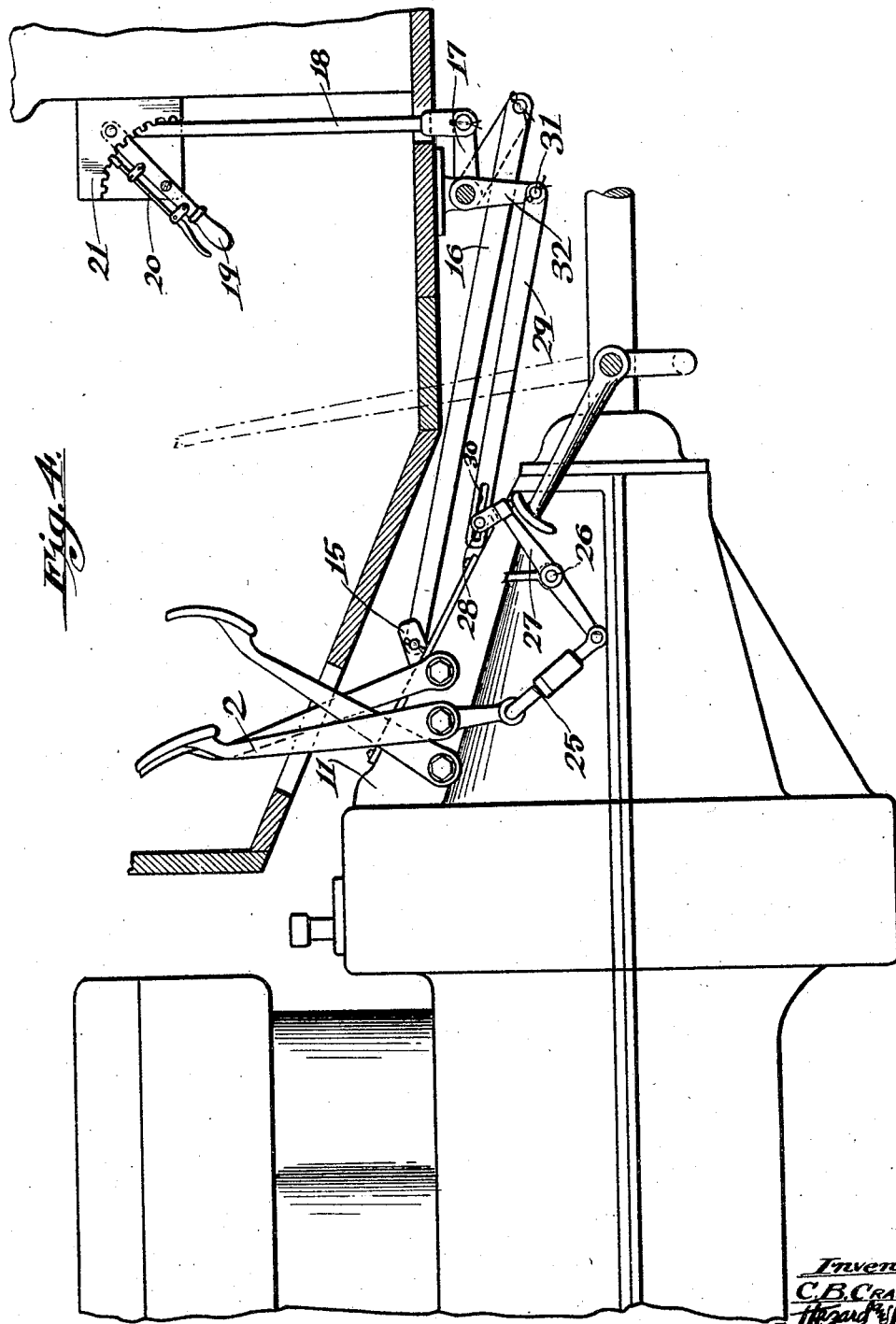

Patented Feb. 5, 1924.

1,482,973

UNITED STATES PATENT OFFICE.

CARL B. CRAMER, OF LOS ANGELES, CALIFORNIA.

LOW-GEAR ATTACHMENT FOR FORDS.

Application filed November 24, 1922. Serial No. 602,999.

*To all whom it may concern:*

Be it known that I, CARL B. CRAMER, a citizen of the United States, residing at Los Angeles, in the county of Los Angeles and State of California, have invented new and useful Improvements in a Low-Gear Attachment for Fords, of which the following is a specification.

This invention relates to power transmission apparatus and more particularly to the transmission of motor vehicles of the Ford type.

It is an object of the present invention to provide means to overcome the necessity of manually holding down in low speed position the foot pedal of the transmission of Fords. Another object of the invention is to provide an auxiliary device for locking or holding the low speed transmission elements in applied position and thus overcome the ordinary practice of manually holding the low speed parts.

A further object of the invention is to provide means for taking up the wear of the low speed parts and therefore overcome the lost motion and failure of operation of these parts after they have worn to a certain extent.

Other objects and advantages will be made manifest in the following specification of an embodiment of the invention illustrated in the accompanying drawings, wherein Fig. 1 is a side elevation of the front portion of a motor vehicle showing the supplementary low speed mechanism combined therewith.

Fig. 4 is a side elevation and partial section showing the combination.

Figure 1:
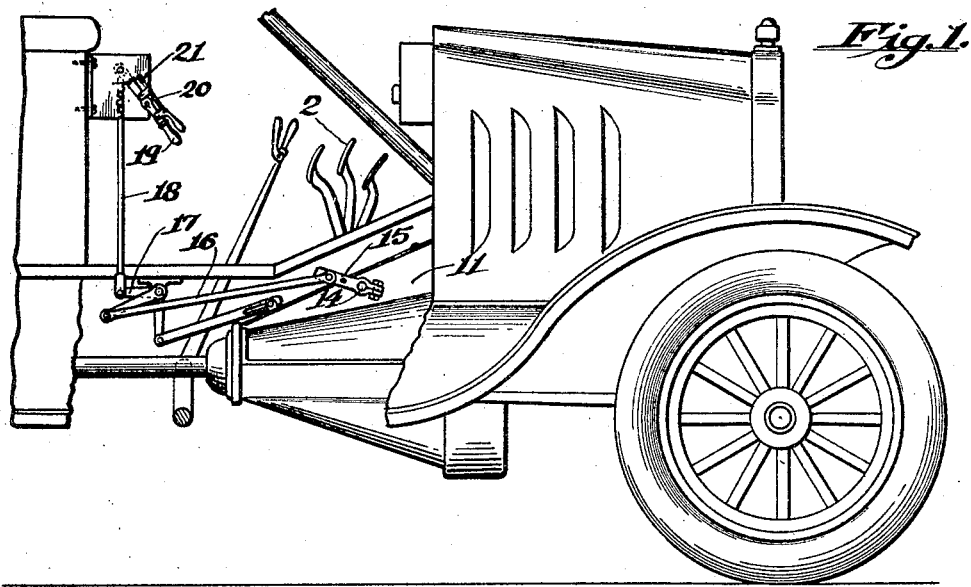
Figure 2:
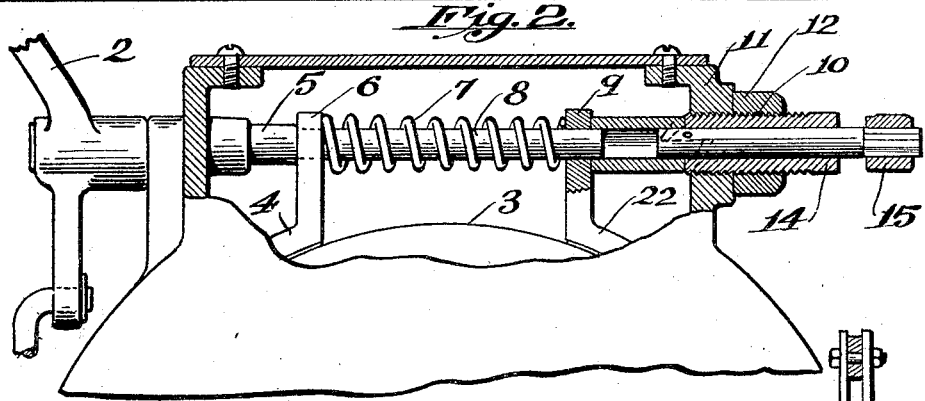
Fig. 2 is a sectional detail showing a portion of the low speed brake band and the usual or standard pedal lever, and the auxiliary setting means.
Figure 3:
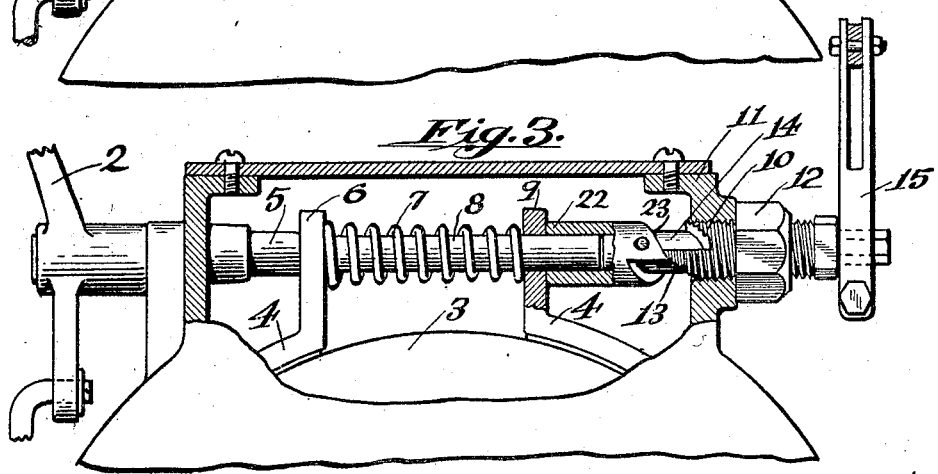
Fig. 3 is a sectional detail showing the auxiliary mechanism in setting position.

As is well known to those familiar with the Ford type of motor vehicle, when running in low gear it is necessary to hold the low gear pedal 2 down for the entire time that it is desired to run on low. This is especially objectionable and tiresome in taking long grades or when taking long trips including numerous grades, and my present invention includes means operative independently of the usual low speed pedal for setting the mechanism on low speed position and locking it for such period as may be desired.

The transmission mechanism of the type concerned includes a drum 3 surrounded by a friction band 4, which, when tightened up on the drum, so affects the mechanism as to force low speed operation of the vehicle. The usual transmission lever 2 is operative when pressed downwardly to contract the friction band 4 by means including a collar or sleeve 5, operative by the pedal 2 to engage a lug 6 on the contiguous end of the band 4. The band is normally expanded when released as by means of an expansion spring 7 surrounding a low speed shaft 8, extending from the lug 6 to a lug 9, which is usually fixedly supported.

The improvement includes a bushing 10 threaded into a side of the gear box at 11, and which bushing is adapted to be locked by a lock nut 12. The inner end of the bushing 10 is shown as provided with cam or helical end faces 13 spaced symmetrically around the end of the bushing. Rotatively mounted in the bushing 10 is a rock-shaft 14 having on its outer end a lever 15 which is shown in Fig. 1 as connected by a link 16 to a bell crank 17, in turn connected by a link 18 to an operating lever 19. This lever may be conveniently disposed for operation by the driver of the vehicle. The handle is provided with a latch 20 designed to engage a toothed quadrant 21, enabling the locking of the link and lever train just described in suitable position.

On the inner end of the rock-shaft 14 is secured or formed a socket 22 which has an end with helical faces 23, complementary to the helical faces 13 of the fixed bushing 10. The contiguous end of the low speed shaft 8 is shown as slidably mounted in the socket 22.

In operation of the auxiliary low gear device, when the handle 19 is manipulated, it will rotate the rock-shaft 14 so that when this is turned in a right hand direction the reaction of the cams 13 and 23 causes the contiguous lug 9, bearing against the socket 22, to be so shifted as to contract the band 4 on the drum 3. The band may be maintained in contracted position and held so by the locking of the hand lever 19, thus entirely obviating the usual requirement of manually holding down the pedal 2 in low speed position.

The invention provides also for taking up of the wear of the low speed parts and thus eliminates the lost motion therein. This effect is secured simply by shifting the hand lever 19 for a notch or so around the quadrant 21 sufficiently to take up the play and set the socket 22 in such position that it will hold the band lug 9 in a new position, determined by the amount of play taken up. This wear-taking adjustment does not interfere in any way with the primary function of low speed locking of the auxiliary device.

When the clutch pedal or speed controlling pedal 2 is in its normal or fully released position it acts through a connection 25 to rock a shaft 26, and through suitable connections closes the high speed brake band and causes the transmission to run in high. It is a feature of the invention to provide means for automatically shifting the clutch pedal from its normal free and high speed position as shown in Fig. 4 to the neutral position of the pedal, and which high is accomplished by means connected to the hand lever 19 which, as above described, is for holding the low speed band in effective position to run at low speed. On the high speed shaft 26 is the usual lever 27 which is connected to the link 25 and on one arm of the lever 27 is provided a pin 28 to which is slidably connected a link 29 having a slot 30 in which the pin 28 plays. The opposite end of the link 29 is connected at 31 to an arm 32 secured to the rock shaft of the bell crank 17.

It will be seen that when the low speed handle 19 is thrown to the low speed position, the bell crank 17 and the lever arm 32 rigidly connected therewith are concurrently actuated, and as the link 16 throws the lever arm 15 of the rock shaft 14, the link 29, after a predetermined sliding movement on the pin 28, engages the same and rocks the lever arm 27 and this through the link 25 brings the pedal to the neutral position and prevents the gear from being in a high speed driving position.

Further embodiments, modifications and variations may be resorted to within the spirit of the invention as here claimed.

What is claimed is:

1. In combination with a low speed mechanism including the usual operating lever, and an independent auxiliary low speed mechanism setting device.

2. In combination with a low speed mechanism including the usual operating lever, an auxiliary low speed mechanism setting device, the said auxiliary device being operable independently of the usual lever.

3. In combination with a low speed mechanism including the usual operating lever, an auxiliary low speed mechanism setting mechanism, including a device adjustable to take up wear of the low speed parts, all independent of the said lever.

4. An auxiliary low speed gear setting device combined with a pedal controlled, variable speed mechanism and including means engageable with an element of the low speed mechanism, and an instrumentality for actuating said means to set the low speed mechanism and negative the normal action of the pedal.

5. In combination with a low speed mechanism including a drum and a contractive band therefor, and the usual setting lever connected to the band, a shiftable device engageable with a part of the band, and means for shifting said device to contract the band.

6. In combination with a low speed mechanism including a drum and a contractive band therefor, and the usual setting lever connected to the band, a shiftable device engageable with a part of the band, means for shifting said device to contract the band; and means for locking the said device and said means in set position.

7. In a power transmitting mechanism including a pedal having an effective high gear and an effective low gear position, and an intermediate neutral position, a low speed drum and a contractive band therefor and which is adapted to be set by the pedal, an auxiliary low speed band setting device, a lever for rendering said device effective, and connections between said lever and the said pedal whereby the latter is shifted to a neutral position when the said lever is actuated.

In testimony whereof I have signed my name to this specification.

CARL B. CRAMER.